United States Patent [19]
Duffield et al.

[11] Patent Number: 5,111,296
[45] Date of Patent: May 5, 1992

[54] DATA TRANSFER FROM A TELEVISION RECEIVER HAVING PICTURE-IN-PICTURE CAPABILITY TO AN EXTERNAL COMPUTER

[75] Inventors: David J. Duffield, Indianapolis; Michael S. Deiss, Zionsville; Billy W. Beyers, Jr., Greenfield; Kevin E. Bridgewater, Indianapolis, all of Ind.

[73] Assignee: Thomson Consumer Electronics, Inc., Indianapolis, Ind.

[21] Appl. No.: 510,711

[22] Filed: Apr. 19, 1990

[51] Int. Cl.⁵ .................................................. H04N 5/265
[52] U.S. Cl. ............................................ 358/83; 358/903
[58] Field of Search .............. 358/183, 182, 181, 180, 358/903, 72

[56] References Cited

U.S. PATENT DOCUMENTS

| | | | |
|---|---|---|---|
| 4,665,438 | 5/1987 | Miron et al. | 358/183 |
| 4,729,027 | 3/1988 | Hakamada et al. | 358/183 |
| 4,750,038 | 6/1988 | Welles et al. | 358/183 |
| 4,774,582 | 9/1988 | Hakamada et al. | 358/183 |
| 4,809,069 | 2/1989 | Meyer et al. | 358/183 |
| 4,812,909 | 3/1989 | Yokobayashi et al. | 358/183 |
| 4,855,813 | 8/1989 | Russell et al. | 358/903 |
| 4,862,269 | 8/1989 | Sonoda et al. | 358/183 |
| 4,890,168 | 12/1989 | Inoue et al. | 358/183 |
| 4,914,516 | 4/1990 | Duffield | 358/183 |
| 4,918,531 | 4/1990 | Johnson | 358/183 |
| 4,935,815 | 6/1990 | Ichikawa et al. | 358/183 |
| 4,954,883 | 9/1990 | Behmares-Sarabis et al. | 358/183 |
| 5,016,106 | 5/1991 | Yong-Je et al. | 358/181 |
| 5,027,212 | 6/1991 | Marlton | 358/183 |

OTHER PUBLICATIONS

Partial schematics of IMC television chassis manufactured by Thomson Consumer Electronics in Europe in 1988.

*Primary Examiner*—James J. Groody
*Assistant Examiner*—Jeffrey S. Murrell
*Attorney, Agent, or Firm*—Joseph S. Tripoli; Peter M. Emanuel; Thomas F. Lenihan

[57] ABSTRACT

The stored digitized video image data stored in a video RAM is transferred from the video RAM in a pix-in-pix television receiver to an external computer via a computer interface circuit under control of the pix-in-pix controller. The computer interface circuit is coupled to the internal controller of the television receiver via an external terminal. The external terminal receives digital control data from the external computer and conveys the stored digitized video image data signals from the video RAM to the external computer.

2 Claims, 4 Drawing Sheets

5,111,296

DATA TRANSFER FROM A TELEVISION RECEIVER HAVING PICTURE-IN-PICTURE CAPABILITY TO AN EXTERNAL COMPUTER

REFERENCE TO A MICROFICHE APPENDIX

A microfiche appendix containing computer program source code has been submitted to the United States Patent and Trademark Office for public access. There is one microfiche having 12 frames included therein. The microfiche contains source code written for an IBM PC and source code written for a Hitachi microcomputer. The source code written for an IBM PC enables video data to be transferred from the subject Pix-In-Pix television receiver to the hard disk unit of the PC. The source code for controller 410, written in assembly language for the HD63B01Y0P microcomputer manufactured by Hitachi Corporation, is included after the IBM source code.

FIELD OF THE INVENTION

This invention relates to the field of television receivers having picture-in-picture capability.

CROSS REFERENCE TO A RELATED APPLICATION

This application is related to an application entitled DATA TRANSFER FROM AN EXTERNAL COMPUTER TO A TELEVISION RECEIVER HAVING PICTURE-IN-PICTURE CAPABILITY, bearing application Ser. No. 511,269 filed Apr. 19, 1990, and assigned to the same assignee as the subject application.

BACKGROUND OF THE INVENTION

Many modern television receivers have picture-in-picture (PIP, or PIX-IN-PIX) capability, that is, the capability to receive video signals from two different sources and combine them to produce a signal which when displayed includes a first program in a main viewing area, and a second program in a secondary (inset) viewing area of the same display screen.

It is known in the art to produce a still picture by storing a "snap-shot-like" still image (i.e., freeze-frame) in a digitized form in a video random access memory (video RAM or VRAM). Such a system is known from the RCA VPT-695 videocassette recorder, sold by Thomson Consumer Electronics, Inc., Indianapolis, Ind.

SUMMARY OF THE INVENTION

It is herein recognized that the stored digitized video image data may be transferred from the video RAM in a pix-in-pix television receiver to an external computer via a computer interface circuit under control of the pix-in-pix controller.

DETAILED DESCRIPTION OF THE EMBODIMENT

Figure 1:
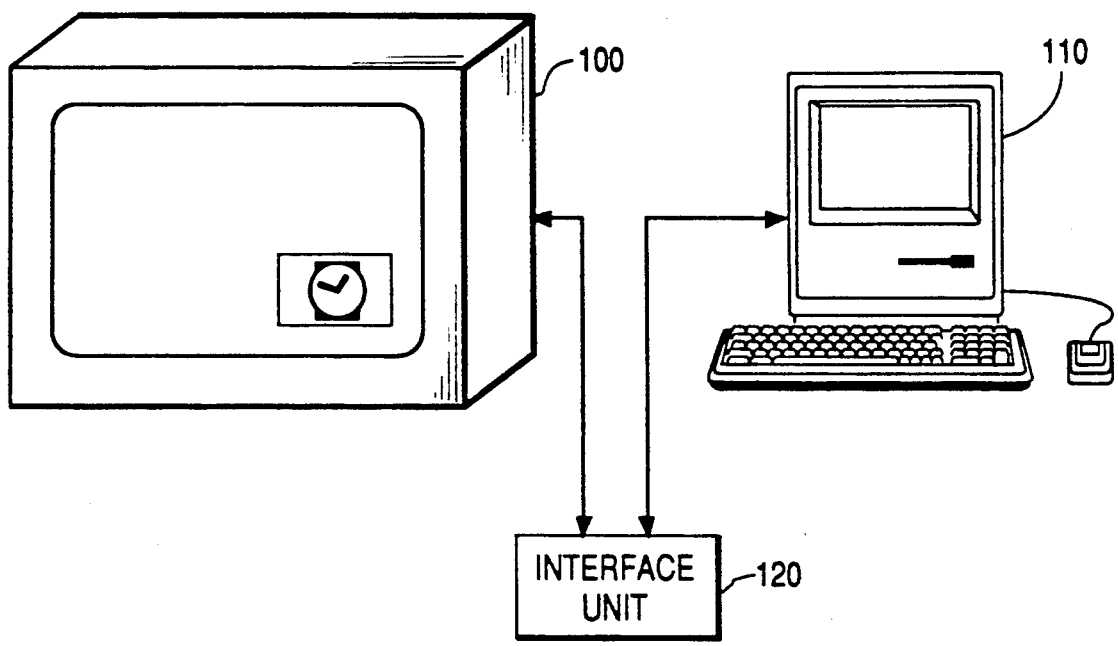
FIG. 1 illustrates, in pictorial form, a system suitable for use with the invention.
Figure 2:
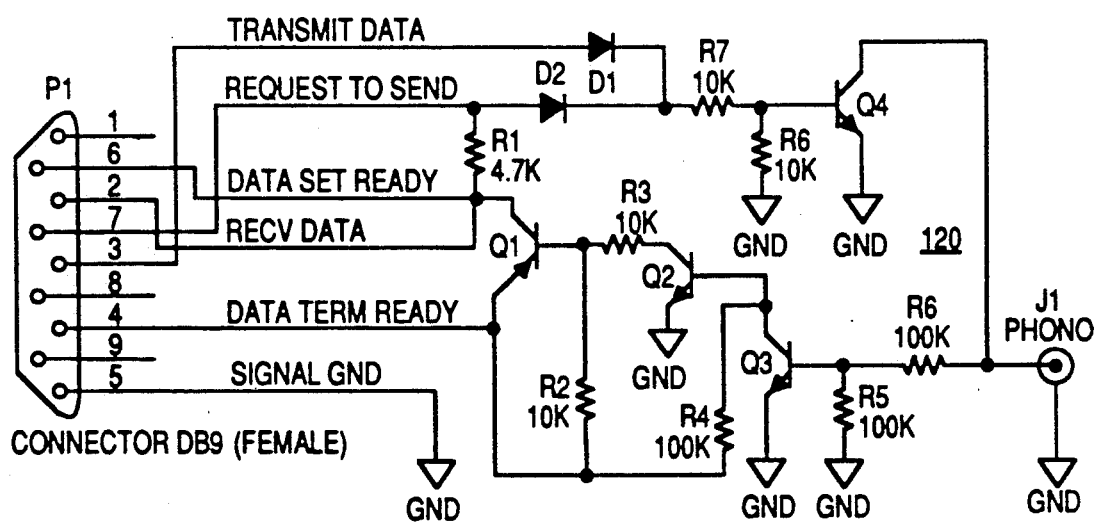
FIG. 2 illustrates in schematic form a communications interface suitable for use with the invention.

Referring to FIG. 1, a television receiver having pix-in-pix capability 100 is connected to an external computer 110 via an interface unit 120 for the interchange of digital signals. While external computer 110 need not be any specific one of the personal computers currently available on the market, an IBM PC was used to develop the data transfer source code listed below.

In an embodiment of the invention which was actually built and evaluated, the communications port for the television receiver was a single wire bi-directional serial communications port. Such a port is known from the communications port used in the RCA DIMENSIA SYSTEM produced by Thomson Consumer Electronics Inc., Indianapolis, Ind. Interface unit 120 converts signals between the DIMENSIA BUS format and the RS-232 format used by most personal computers. Interface unit 120 may be eliminated by providing standard RS-232 communications capability in the television receiver.

Briefly, signals REQUEST TO SEND and TRANSMIT DATA from personal computer (PC) 110 are OR'ed together by diodes D1 and D2 and applied to a DIMENSIA BUS phono connector J1 via open-collector transistor Q4. Data signals from the television receiver are applied to the RECEIVE DATA terminal of a DB9 connector P1 via transistors Q3, Q2, and Q1. The DATA SET READY line is coupled to The RECEIVE DATA line.

Figure 3:
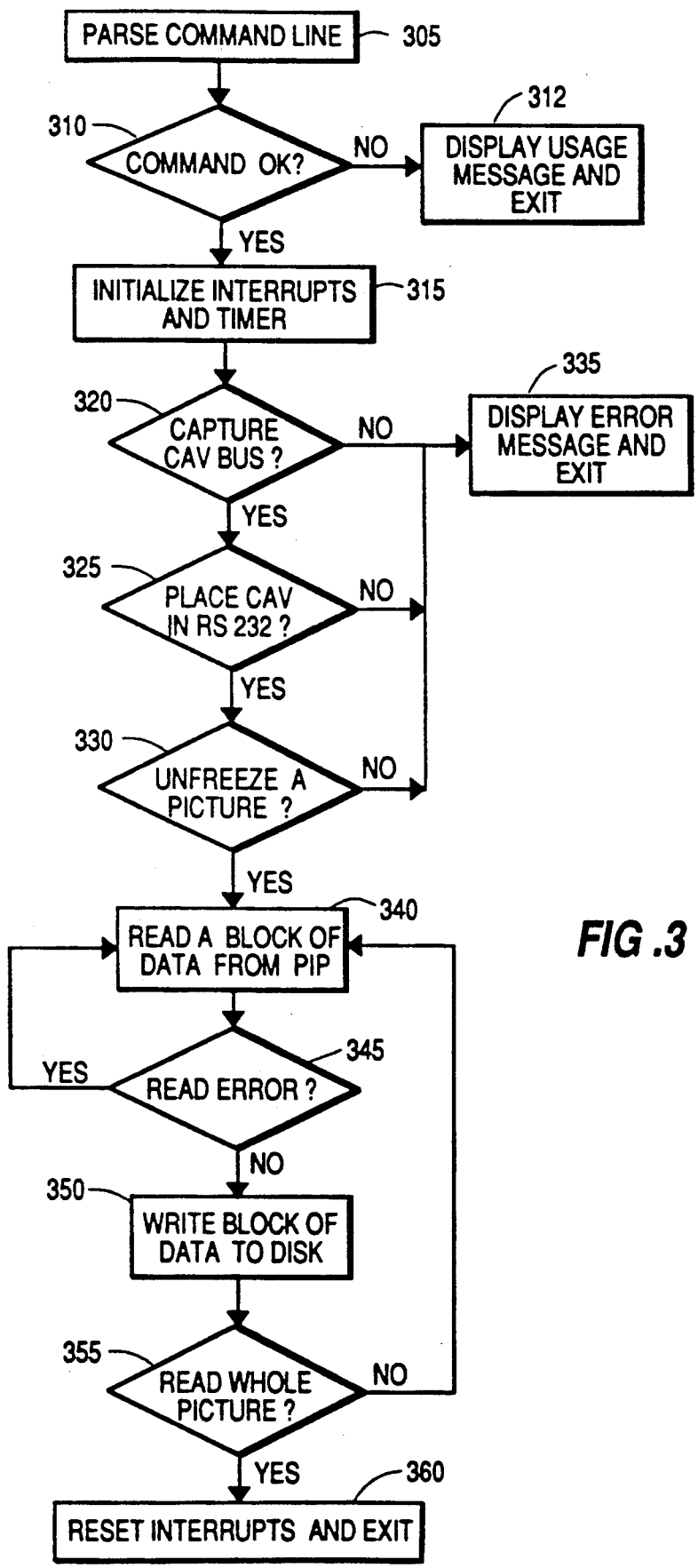
FIG. 3 is a flowchart showing a portion of a control program for the external computer of FIG. 1.

External computer 110 initiates the data transfer from the video RAM under control of a program according to the flowchart of FIG. 3. Referring to FIG. 3, the program of FIG. 3 is entered at step 305 in response to the entering of a computer command by a user. The phrase PARSE COMMAND LINE of step 305 means decode the command received. The command is examined at step 310 to determine if it is an executable command. If it is not, an error message is displayed and the program is exited (step 312). If the command is executable, a procedure is begun in which interrupts are enabled and the communication the television receiver is attempted (steps 315-330). The DIMENSIA BUS is also referred to as the CAV BUS and these terms as used herein have the same meaning. In the event that communication with television receiver 100 is not achieved, then an error message is displayed and the program is exited (step 325). However, if communication with television receiver 100 is achieved, then the transfer of digitized video data stored in the video RAM of the pix-in-pix circuitry of television 100 is begun in accordance with steps 340-355. When the transfer is complete, the interrupts are reset and the program is exited at step 360.

Figure 4:
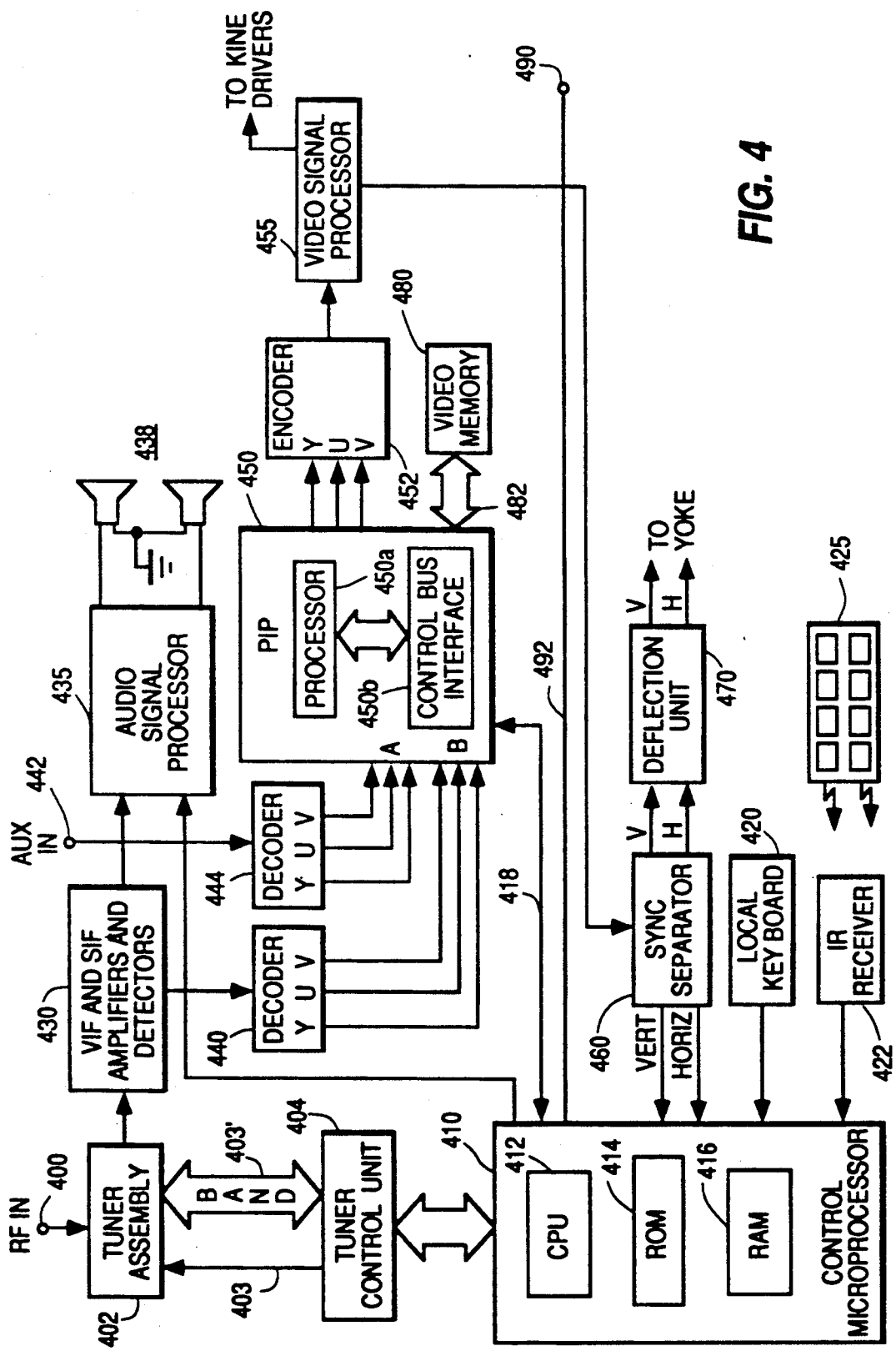
FIG. 4 illustrates, in block diagram form, an embodiment of the invention incorporated within the television receiver of FIG. 1.

A simplified block diagram of an embodiment of the invention is shown in FIG. 4. Referring to FIG. 4, radio frequency (RF) signals are applied to an RF input terminal 400 of a tuner assembly 402. Tuner assembly 402 selects a particular RF signal under control of a tuner control unit 404 which applies a tuning control signal to tuner assembly 402 via a wire 403, and applies band-switching signals via a control bus 403'. Tuner control unit 404 is controlled by a controller 410. Controller 410, which may be a microprocessor or microcomputer, includes a central processing unit (CPU) 412, a read-only memory (ROM) 414, and a random access memory 416. Controller 410 receives user-entered control signals from a local keyboard 420 and from an infrared (IR) receiver 422. IR receiver 422 receives and decodes remote control signals transmitted by a remote control unit 425.

Tuner 402 produces a signal at an intermediate frequency (IF) and applies it to a processing unit 430 comprising a video IF (VIF) amplifying stage an AFT circuit, and video detector, and a sound IF (SIF) amplifying stage. Processing unit 430 produces a baseband video signal (TV), and a sound carrier signal. The sound carrier signal is applied to an audio signal processor unit 435 which includes an audio detector and a stereo decoder. Audio signal processor unit 435 produces baseband left and right audio signals and applies them a pair of speakers 438 for sound reproduction.

The baseband video signal (TV) is coupled to an decoder 440 which produces a luminance Y signal, and U and V color component signals. A video input terminal 442 labelled AUX IN is provided for receiving a baseband video signal from an external source. The externally supplied baseband video signal is applied to a second decoder unit 144 which also produces a luminance Y signal, and U and V color component signals. The derived Y, U, and V signals are applied to input terminals A and B of a picture-in-picture (PIP) processing unit 450, respectively.

PIP unit 450 includes a processor unit 450a for processing the applied video signals, and a control bus interface unit 450b for communicating with controller 410 over a serial control bus 418. Serial control bus 418 couples command data from controller 410 which controls PIP unit 450 to produce an image for display having a main (or primary) picture and an inset (or secondary) picture. Under controller command, via serial bus 418, the PIP function may be enabled and disabled, and the inset picture may be displayed, for example, in each of the four corners, or in several other areas. Also under controller command via serial bus 418, PIP unit 450 may be controlled to interchange (swap) the main and inset television images.

The output Y, U, and V signals of PIP unit 450 are to an encoder unit 452 which converts them into a composite video signal for further processing by video signal processor unit 455 and ultimately displayed on a display screen of a display device (not shown). Video signals are also applied to a sync separator unit 460 which derives vertical and horizontal synchronizing signals therefrom. The derived vertical and horizontal signals are applied to controller 410 and to a deflection unit 470 for the production of deflection signals for application to a yoke assembly (not shown).

PIP unit 450 is coupled to a video memory unit (video RAM) 480 by a data bus 482. Video RAM 480 is preferrably large enough to store one field of a television picture (i.e., field store memory). The term field store memory as used herein means a memory capable of storing 220 television lines of data wherein each television line comprises 512 8-bit bytes of data. It should be noted that controller 410 can cause PIP unit 450 to address any individual memory location of video RAM 480, by sending the appropriate command over serial control bus 418.

Controller 410 is coupled to a serial digital communications port 490 via a wire 492. The present invention is directed to that portion of FIG. 1 and to the program instructions of controller 410 which in combination allow the transfer of a field of digitized video information from video RAM 480 to an external computer via serial digital communications port 490 under control of controller 410.

Figure 5:
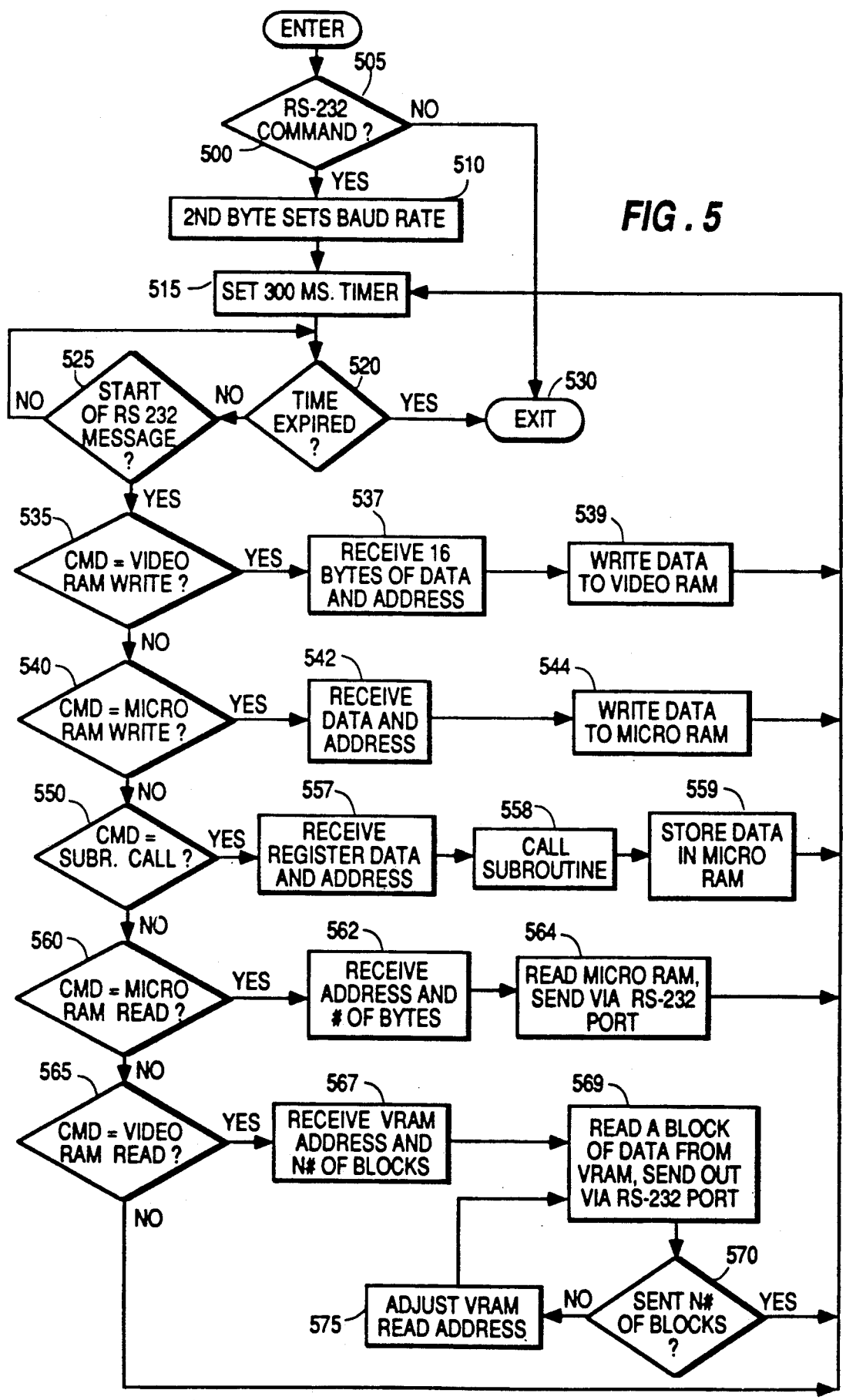
FIG. 5 is a flowchart showing a portion of a control program for the microcomputer of FIG. 4.

The RS-232 decoding portion of the control program for controller 410 is shown in FIG. 5. The routine is entered at step 500, and advances to step 505 where it determines if an external computer has communicated a command to enter the RS-232 mode. If not the routine is exited at step 530 to the remainder of the DIMENSIA SYSTEM decoding routines. If an ENTER RS-232 MODE command has been received, then the program advances to step 510 in which the second byte of the command is used to set the baud rate for RS-232 type communication. At step 515, a 300 ms timer is set, and at step 520 a loop is entered in which the timer is repeatedly an RS-232 message (step 525). If the timer expires then the routine is exited at step 530. If an RS-232 message has begun then the program advances to the command parsing routines (steps 535, 540, 550, 560, and 565). If the command received is the VIDEO RAM WRITE command then the program receives 16 bytes of data and the starting address of the memory locations in video RAM (VRAM) in which the data is to be stored. The data is then written to the VRAM at step 539 and the program returns to step 515. At step 540, the program checks to see if the command received is the MICRO RAM WRITE command. If so, then the program receives data and a starting address in the RAM 416 of controller 410. The data is written to RAM 416 in step 544. At step 550 the program determines if the command received is a subroutine call. If so, the program receives data for the setting of registers in CPU 412 of controller 410, and an address in ROM 414 of the subroutine to execute (step 557). At step 558 the subroutine is called. At step 559 any data which resulted from the subroutine call is stored in a specific area of RAM 416 so that the external computer can access it with a MICRO RAM READ command. At step 560, the program checks to see if the command received is a MICRO RAM READ command. If so, at step 562 it receives the address of the starting location in RAM 416 from which to begin reading, and the number of bytes to be read. At step 564 the data is read from RAM 416 and transmitted to the external computer via the serial communications port. At step 565, the program determines if the command received is a VIDEO RAM READ command, if not the program returns to step 515. If so, then at step 567 the program receives the starting address of the VRAM read location and the number of blocks N to be read, with each block being 16 bytes long. At step 569 a block of data is read from the VRAM and sent to the external computer via the serial communications port. At step 570 a check is made to see if all requested blocks have been sent. If so, the program returns to step 515. If not, then the VRAM starting location for the reading operation is adjusted by 16 bytes and another block of data is read, until all requested data has been sent.

By use of the above-described system, a user can employ his pix-in-pix television to freeze a frame of video, and transfer it via a digital communications link to his personal computer. Once the digitized field of video is stored in the user's PC it can be "imported" into "painting" programs (i.e., graphics programs) to be modified as the user wishes, or "imported" into a word processing program to become a figure in a report or letter. It is also possible to send the digitized video image to other, distant computers via a standard computer modem coupled to a telephone line.

The term television receiver, as used herein, includes television receivers having a display device (commonly known as television sets) and television receivers without a display device, such as VCRs.

It is also noted that when the television receiver is not using the pix-in-pix module, that data can be transferred to and from the VRAM without affecting the picture observed by the viewer.

What is claimed is:

1. A picture-in-picture system for a television receiver, comprising:

data entry means for generating data signals in response to activation by a user;

a terminal for receiving digital control signals from an external unit;

memory means for storing data;

picture-in-picture processing means for receiving a video signal, for storing a predetermined amount of said video signal in said memory means in response to a first control signal, for reading video-representative data from said memory means in response to a second control signal, and for producing a display signal for display on a display screen;

control means for controlling said picture-in-picture processing means, said control means having a first input coupled to said data entry means for receiving said data signals, having a second input coupled to said terminal for receiving said digital control signals, and having an output for developing said first and second control signals in response to one of said data signals and said digital control signals, said control means applying said video-representative data read from said memory means to said terminal for transfer to said external unit.

2. A picture-in-picture system for a television receiver, comprising:

a terminal for receiving control digital signals from an external computer;

a source of video signals;

memory means for storing data related to said video signals;

picture-in-picture processing means coupled to said source of video signals for receiving said video signals, and coupled to said memory means for storing a predetermined amount of said video signals in response to a first control signal, for reading said video-related data from said memory means in response to a second control signal, and for producing a display signal for display on a display screen;

control means for controlling said picture-in-picture processing means, said control means having a first input coupled to said terminal for receiving said digital control signals, and having an output for developing said first and second control signals;

said control means in response to said digital control signals generates said first control signal causing said picture-in-picture processing means to store said predetermined amount of said video signals, and generates said second control signal causing said picture-in-picture processing means to read said video-related data, said control means transmitting said video-related data to said external computer via said terminal.

* * * * *